United States Patent
Cisowski et al.

(10) Patent No.: US 9,796,888 B2
(45) Date of Patent: Oct. 24, 2017

(54) WET GLUE

(71) Applicant: Rohm and Haas Company, Philadelphia, PA (US)

(72) Inventors: Natacha Cisowski, Nice (FR); Isabelle Uhl, Valbonne (FR)

(73) Assignee: Rohm and Haas Company, Collegeville, PA (US)

(*) Notice: Subject to any disclaimer, the term of this patent is extended or adjusted under 35 U.S.C. 154(b) by 0 days.

(21) Appl. No.: 15/426,100

(22) Filed: Feb. 7, 2017

(65) Prior Publication Data

US 2017/0145265 A1    May 25, 2017

Related U.S. Application Data

(62) Division of application No. 15/170,276, filed on Jun. 1, 2016, now Pat. No. 9,670,389, which is a division of application No. 14/403,206, filed as application No. PCT/US2013/046510 on Jun. 19, 2013.

(30) Foreign Application Priority Data

Jun. 28, 2012 (EP) .................................... 12290213

(51) Int. Cl.
C09J 133/12 (2006.01)
B32B 37/12 (2006.01)
C09J 133/08 (2006.01)
B32B 38/10 (2006.01)
B32B 43/00 (2006.01)

(52) U.S. Cl.
CPC .......... C09J 133/12 (2013.01); B32B 37/1284 (2013.01); B32B 38/10 (2013.01); B32B 43/006 (2013.01); C09J 133/08 (2013.01); B32B 2519/00 (2013.01)

(58) Field of Classification Search
CPC .................................................. B32B 37/1284
See application file for complete search history.

(56) References Cited

U.S. PATENT DOCUMENTS

| | | | |
|---|---|---|---|
| 4,439,494 A | 3/1984 | Olson | |
| 5,274,064 A | 12/1993 | Sarkar | |
| 5,744,243 A | 4/1998 | Li et al. | |
| 6,103,788 A | 8/2000 | Harui et al. | |
| 6,753,355 B2 | 6/2004 | Stollmaier et al. | |
| 7,041,720 B2 | 5/2006 | Aydin et al. | |
| 7,807,739 B2 * | 10/2010 | Obst .................... | C08K 5/5435 524/261 |
| 2001/0021452 A1 | 9/2001 | Kishioka et al. | |
| 2006/0228545 A1 | 10/2006 | Husemann et al. | |
| 2010/0273930 A1 | 10/2010 | Shirakami et al. | |

FOREIGN PATENT DOCUMENTS

| | | |
|---|---|---|
| EP | 0924761 A1 | 6/1999 |
| JP | H04015281 A | 1/1992 |
| JP | 2007238730 A | 9/2007 |
| TW | 200609319 | 3/2006 |
| WO | WO-99/66004 A1 | 12/1999 |
| WO | WO-2009021814 A1 | 2/2009 |

OTHER PUBLICATIONS

International Search Report and Written Opinion for PCT/US2013/046510, Dated Aug. 9, 2013, pp. 1-7.
International Preliminary Report on Patentability for PCT/US2013/046510, Dated Dec. 31, 2014, pp. 1-4.
European Search Report for EP 12290213, Dated Sep. 14, 2012, pp. 1-3.

* cited by examiner

*Primary Examiner* — Daniel Lee

(57) ABSTRACT

An aqueous adhesive composition including a certain emulsion polymer and an epoxysilane wherein the adhesive composition is substantially free from crosslinking agent is provided. A method for providing a substrate bearing a paper label, the adhered label having ice water resistance, and a method for removing the paper label from the substrate are also provided.

3 Claims, No Drawings

WET GLUE

This invention relates to an aqueous adhesive composition, commonly known as a wet glue adhesive. More particularly, the invention relates to an aqueous adhesive composition including: a) an emulsion polymer comprising, as copolymerized units, from 10% to 35%, by weight based on the weight of the emulsion polymer, carboxylic acid monomer and at least one second ethylenically unsaturated monomer; and b) from 0.1% to 4%, by weight based on emulsion polymer weight, epoxysilane; wherein the adhesive composition is substantially free from crosslinking agent. The invention also relates to a method for providing a substrate bearing a removable paper label, and a method for removing a paper label from a substrate bearing a removable label comprising.

Wet glue adhesives based on alkali-swellable acrylic polymers for paper label applications are commonly applied to glass beverage bottles. The labels must adhere to the bottle when placed in ice water baths yet be readily removable in recycling operations that typically use high temperature and caustic solutions. Wet glue compositions based on this chemistry exhibit poor ice bath resistance and require, for example, the addition of natural products such as, for example, casein or starch to improve resistance.

US Patent Application Publication No. 20010021452 discloses pressure sensitive adhesive formed from an acrylic polymer, a silane coupling agent, and a crosslinking agent having certain sol and gel content. Adhesive compositions having a desirable balance of ice water resistance and removability in label applications are still needed. The adhesive compositions of the present invention provide such a balance of properties.

In a first aspect of the present invention, there is provided an aqueous adhesive composition comprising: a) an emulsion polymer comprising, as copolymerized units, from 10% to 35%, by weight based on the weight of said emulsion polymer, carboxylic acid monomer and at least one second ethylenically unsaturated monomer; and b) from 0.1% to 4%, by weight based on said emulsion polymer dry weight, epoxysilane; wherein said adhesive composition is substantially free from crosslinking agent.

In a second aspect of the present invention there is provided a method for providing a substrate bearing a removable paper label comprising (a) forming the aqueous adhesive composition of the first aspect of the present invention; (b) applying said aqueous adhesive composition to said paper label; and (c) applying said label-bearing adhesive to said substrate.

In a third aspect of the present invention there is provided a method for removing a paper label from a substrate bearing a removable paper label comprising: (a) providing the substrate bearing a removable paper label of the second aspect of the present invention; and (b) contacting said removable label with an alkaline solution for a time and at a temperature sufficient to remove said label.

The present invention relates to an aqueous adhesive composition. By "aqueous composition" herein is meant water and from 0% to 30%, by weight based on the weight of the medium, of water-miscible compound(s).

The aqueous adhesive composition, alternatively an aqueous paper label adhesive composition, includes an emulsion polymer comprising, as copolymerized units, from 10% to 35%, preferably from 15% to 30%, by weight based on the weight of the emulsion polymer, carboxylic acid monomer and at least one second ethylenically unsaturated monomer. Such an emulsion polymer falls in the category of polymers commonly referred to as alkali-swellable polymers. Suitable carboxylic acid monomers include, for example, acrylic acid, methacrylic acid, crotonic acid, itaconic acid, fumaric acid, maleic acid, monomethyl itaconate, monomethyl fumarate, monobutyl fumarate, and maleic anhydride. Preferred carboxylic acid monomers are (meth)acrylic acid.

The at least one copolymerized second monoethylenically unsaturated monomer excludes carboxylic acid monomers and includes, for example, (meth)acrylic ester monomers including methyl (meth)acrylate, ethyl (meth)acrylate, butyl (meth)acrylate, 2-ethylhexyl (meth)acrylate, decyl (meth)acrylate, hydroxyethyl (meth) acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. Preferred are polymers the backbones of which are predominantly acrylic or styrene-acrylic compositions.

Optionally, low levels of multiethylenically unsaturated monomers such, for example, allyl (meth)acrylate, diallyl phthalate, butadiene, 1,4-butylene glycol di(meth)acrylate, 1,2-ethylene glycol di(meth)acrylate, 1,6-hexanediol di(meth)acrylate, and divinyl benzene may be incorporated in the emulsion polymer. Levels such as from 0% to 0.5% multiethylenically unsaturated monomer are contemplated to be used but must be selected so as not to compromise the adhesive properties of the composition.

The emulsion polymerization techniques typically used in the method for forming the first polymer of the present invention are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal, or ammonium, alkyl, or ethoxylated alkyl, sulfates, alkyl sulfonic acids, fatty acids, phosphate surfactants such as, for example, RHODOFAC™ RS-610 and RHODOFAC™ RS-960 and oxyethylated alkyl phenols. The amount of surfactant used is usually 0.1% to 6% by weight, based on the weight of total monomer. Either thermal or redox initiation processes may be used. Conventional free radical initiators, also referred to as catalysts, may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant, also referred to as an activator, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers.

The monomers may be added individually or in monomer mixtures; they may be added neat or as an emulsion in water. In some embodiments the monomer is added in two or more stages.

Processes yielding polymodal particle size distributions such as those disclosed in U.S. Pat. Nos. 4,384,056 and 4,539,361, for example, may be employed.

The average particle diameter of the aqueous emulsion polymer particles is typically from 30 nm to 500 nm, preferably from 75 nm to 300 nm, and more preferably from 90 nm to 250 nm as measured by a Brookhaven Model BI-90 Particle Sizer supplied by Brookhaven Instrument Corp., Holtsville, N.Y.

The aqueous adhesive composition of the present invention includes from 0.1% to 4%, preferably from 1.5% to 3.0%, by weight based on the emulsion polymer dry weight, epoxysilane. "Epoxysilane" herein includes glycidoxyalkyl trimethoxy silanes. Preferred is 3-gycidoxypropyl trimethoxy silane.

The pH of the aqueous adhesive composition is typically in the range of from 3 to 11, and preferably, in the range of from 6 to 10. Any pH adjustment of the aqueous adhesive composition is preferably effected with ammonia. A suitable viscosity range for the aqueous adhesive composition is from 50,000 cps to 120,000 cps (Brookfield viscosity, RVT spindle 7, speed 20 rpm), preferably from 80,000 caps to 120,000 cps.

The aqueous adhesive composition may contain, in addition to the emulsion polymer, film-forming or non-film-forming solution or second emulsion polymers in an amount of 0% to 200% by weight of the first polymer of the present invention, such as, for example, urea and natural products from plant or animal sources and materials derived therefrom such as, for example, starch and casein. If an optional second emulsion polymer is an emulsion polymer including, as copolymerized units, from 10% to 35%, by weight based on the weight of said emulsion polymer, carboxylic acid monomer and at least one second ethylenically unsaturated monomer, the level of carboxylic acid is calculated based on the overall composition of the emulsion polymers. Other ingredients include optional organic or inorganic pigments or extenders, and conventional adjuvants such as, for example, emulsifiers, coalescing agents, plasticizers, antifreezes, buffers, neutralizers, thickeners, photosensitive moieties, rheology modifiers, humectants, wetting agents, biocides, plasticizers, antifoaming agents, UV absorbers, fluorescent brighteners, light or heat stabilizers, biocides, chelating agents, dispersants, colorants, water-repellants, and anti-oxidants.

The aqueous adhesive composition is substantially free from crosslinking agents, i.e., substantially free from separate compounds or compositions capable of crosslinking the emulsion polymer. The epoxysilane component of the aqueous adhesive composition is expressly excluded from "crosslinking agents" herein. By "substantially free of crosslinking agent" herein is meant a level of less than 0.001 parts by weight crosslinking agent based on the dry weight of the emulsion polymer. "Crosslinking agents" herein include polyfunctional melamine compounds, polyfunctional epoxy compounds, polyfunctional isocyanate compounds, and the like.

In the method for providing a substrate bearing a removable paper label of the invention the adhesive composition is applied to a paper label. "Paper label" herein includes labels formed from any of various forms of paper, coated paper, printed paper, paper bearing metalized coatings or foils. Conventional wet adhesive application methods may be used. The aqueous adhesive composition on the paper label may be advantageously applied to substrates such as, for example, glass and polymeric material. Drying is typically effected under ambient conditions such as, for example, at 0° C. to 35° C.

In the method for removing a paper label from a substrate bearing a removable paper label the removable label is contacted with an alkaline solution for a time and at a temperature sufficient to remove the label. "Removability" herein is judged by the results of the "wash-off test" detailed I the Experimental test methods below.

EXPERIMENTAL TEST METHODS

Ice Water Resistance

Wet adhesives were applied to labels with a Meyer bar at a dry level of 5-8 g/m2. Labels with the dimensions 60×80 mm were used.

The labels attached to glass bottles were stored for 4 days at ambient temperature. After storage, the bottles were filled with water and immersed in an ice water bath. The time until the labels became detached was noted. A value of 5 days or greater in this test is rated as passing.

Wash-Off Test.

This test procedure was used for the testing of the detachability of adhesives in a hot, aqueous alkaline solution.

"Wash-off ability" is the ability of an adhesive to detach itself quickly and completely in a 1.0-2.0% solution of sodium hydroxide at 65-75° C. Labels with the dimensions 60×80 mm were used.

The labels attached to glass bottles were stored for at least 24 hours under standard climate conditions: 23° C.±2° C., 50% RH±5% RH. After storage, the bottles were filled with water at the testing temperature and immediately immersed in the solution of sodium hydroxide at the testing temperature. The time until the labels became detached and the location of the adhesive after the label had detached were noted. A value of 5 minutes or less in this test is rated as passing.

The following examples serve to illustrate the invention.

Abbreviations Used
 Ethyl acrylate EA
 Butyl acrylate BA
 2-Ethylhexyl acrylate EHA
 Methyl methacrylate MMA
 Butyl methacrylate BMA
 Methacrylic acid MAA
 Styrene Sty
Aqueous Emulsion Polymer Compositions (Weight Basis):
 Emulsion polymer A=p(50 EA/3 Sty/25 MMA/18 MAA)
 Emulsion Polymer B=p(80 EA/20 MAA)
 Emulsion Polymer C=p(62 BMA/38 MAA)
 Emulsion Polymer D=p(56EA/5EHA/36MAA)

EXAMPLES 1-2 and COMPARATIVE EXAMPLES A-B

Formation and Evaluation of Aqueous Adhesive Compositions

The aqueous adhesive compositions were applied to a paper label at a level of 24 g/m2 wet with a No.3 bar and dried for 4 days at ambient conditions.

| | Example | | | |
|---|---|---|---|---|
| | 1<br>Polymer B +<br>2% SILQUEST<br>A-187 | 2<br>Polymer A +<br>2% SILQUEST<br>A-187 | Comp. A<br>Polymer D +<br>2% SILQUEST<br>A-187 | Comp. B<br>Polymer C +<br>2% SILQUEST<br>A-187 |
| Solids % | 35.3 | 29.4 | 8.5 | 30.7 |
| pH | 7.1 | 8.1 | 7.8 | 7.26 |
| Add-on (24 g/m² wet with bar n°3) | | | | |
| dry (5-8 g/m²) | 8 | 6.6 | 5.9 | 6.8 |
| Ice water resistance | >15 days | 6 days | >15 days | 3 hours |
| Wash-off test (Final FTM26)* (minutes) | 4 min < wash off < 5 min<br>no adhesive remained on the bottles | 1 min | >5 min<br>no adhesive remained on the bottles | NA |

*soda bath at 1.5%/temperature: 71.4° C.

SILQUEST™ A-187 is an epoxy functional silane from Momentive Specialty Chemicals Inc. (Columbus, Ohio).

The aqueous adhesive compositions, Examples 1-2, of the invention exhibited desirable levels of ice water resistance and wash off performance

What is claimed is:

1. A method for removing a paper label from a substrate, comprising:

providing the substrate bearing the paper label, the paper label comprising:

an aqueous adhesive composition substantially free from crosslinking agent, the adhesive composition comprising:

an emulsion polymer comprising, as copolymerized units, from 10% to 35%, by weight based on the emulsion polymer weight, carboxylic acid monomer and at least one second ethylenically unsaturated monomer; and from 0.1% to 4%, by weight based on the emulsion polymer dry weight, an epoxysilane; and contacting the removable paper label with an alkaline solution for a time and at a temperature sufficient to remove the paper label.

2. The method of claim 1, wherein the time is not to exceed 5 minutes.

3. The method of claim 1, wherein the temperature is from 65 to 75° C.

* * * * *